United States Patent [19]

Bond

[11] Patent Number: 4,725,858

[45] Date of Patent: Feb. 16, 1988

[54] ROLLER PRESSURE UNLOADING MEANS FOR A THERMAL PRINTING MECHANISM

[75] Inventor: Joseph N. Bond, Commack, N.Y.

[73] Assignee: Miltope Corporation, Melville, N.Y.

[21] Appl. No.: 900,456

[22] Filed: Aug. 26, 1986

[51] Int. Cl.[4] ........................ G01D 15/24; B41J 19/96

[52] U.S. Cl. ........................ 346/136; 400/555; 400/649

[58] Field of Search ................ 346/136; 400/554, 555, 400/649

[56] References Cited

U.S. PATENT DOCUMENTS

| | | | |
|---|---|---|---|
| 1,886,845 | 11/1932 | Stickney | 400/555 |
| 4,026,404 | 5/1977 | Burkhardt | 400/649 |
| 4,098,389 | 7/1978 | Kwan | 400/649 |
| 4,358,776 | 11/1982 | Mitsui | 346/136 X |
| 4,444,521 | 4/1984 | Rickhard et al. | 346/136 X |
| 4,538,932 | 9/1985 | Takenoya et al. | 400/649 X |

*Primary Examiner*—E. A. Goldberg
*Assistant Examiner*—Mark Reinhart
*Attorney, Agent, or Firm*—Gottlieb, Rackman & Reisman

[57] ABSTRACT

A thermal printer having a mechanism for alleviating the pressure between the print head and the resilient roller when the printer is not operational is provided. The printer includes a cam member for camming the print head and resilient roller apart during non-printing in order to prevent a permanent or semi-permanent flat from being formed on the roller because of pressure exerted thereon by the print head.

21 Claims, 9 Drawing Figures

ROLLER PRESSURE UNLOADING MEANS FOR A THERMAL PRINTING MECHANISM

BACKGROUND OF THE INVENTION

This invention relates to an apparatus and method for alleviating pressure between the print head the resilient roller of thermal printing mechanisms when printing is not taking place. In particular, the method involves the use of a cam means, such as a lever, for camming apart the surface of the print head and the resilient roller.

It is generally known that thermal printing mechanisms including a resilient roller for pressing thermally sensitive paper against a thermal print head in order to achieve a visual effect (usually an alphanumeric printout) on the paper. The print head typically contains minute resistors arranged in a row and positioned so that they come into contact with the paper along a line which is substantially perpendicular to the direction of movement of the paper during operation of the printing mechanism. When an electrical current is passed through the resistors, the heat generated therefrom produces small dot images on the thermally sensitive paper. In order to create the desired printout, the number and location of dots to be printed in each row, and the longitudinal velocity of paper movement along the print head, are properly selected, usually under microprocessor control.

However, conventional thermal printing mechanisms are not completely satisfactory. Because there is considerable pressure between the print head and the resilient roller, a flat may be formed on the roller at points of contact with the print head. If the printing mechanism is not operated for a considerable length of time, the flat may become permanent, and as a result, print quality will be less than desirable. Yet in some applications, long periods of inactivity may be desirable or even required.

Accordingly, it is an object of the present invention to provide a thermal printing mechanism which does not produce flats on the resilient roller when not operated for any length of time.

Still other objects and advantages of the invention will, in part, be obvious and will, in part, become apparent from the following specification.

SUMMARY OF INVENTION

Generally speaking, in accordance with the present invention, a thermal printing mechanism having an arrangement for alleviating the pressure between the print head and the resilient roller when the printing mechanism is not operational is provided. The arrangement includes a cam means for camming the print head and resilient roller apart when printing is not taking place in order to prevent a permanent or semi-permanent flat from being formed on the resilient roller due to the pressure exerted thereon by the print head.

In the preferred embodiment, the resilient roller includes a pair of serrated friction discs disposed at either end which simultaneously rotate with the roller during operation. Located on either side of the resilient roller is an unloading lever, including a tapered shoulder extending under each serrated friction disc. The shoulder is constructed with its front portion having a series of serrations similar to the serrations along the fiction discs of the roller.

During printing, forward rotation of the resilient roller drives the unloading levers in the direction of paper movement. Since only the front portions of the shoulders are serrated, the levers rotate until there is no force between the print head and the lever, and the serrations on the shoulders disengage from the serrations on the friction discs.

When the printing operation ends or is temporarily suspended, the electronics in the printing mechanism cause the resilient roller to rotate slightly in a reverse direction. This reverse rotation, coupled with a small spring force exerted on the unloading levers, causes the serrations on the shoulders and the discs to engage. As a result, the levers are rotated in a reverse direction opposite the direction of paper movement. Since each tapered shoulder increases in thickness from its rearward end to its forward end, rotation of the levers cams the print head and resilient roller apart and provides a narrow space between the head and the roller. Accordingly, the pressure on the resilient roller is removed and the formation of flats thereon is prevented.

A feature of the invention, therefore, is to provide a thermal printing mechanism which alleviates the pressure between the resilient roller and the print head when the printing process is not taking place.

Another feature of the present invention to provide a camming mechanism for separating apart the print head and the resilient roller when printing does not occur.

The invention therefore comprises an apparatus having the features of construction, combination of elements and arrangement of parts which are herein described, and a method having the steps and the relation of such steps with respect to the others, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
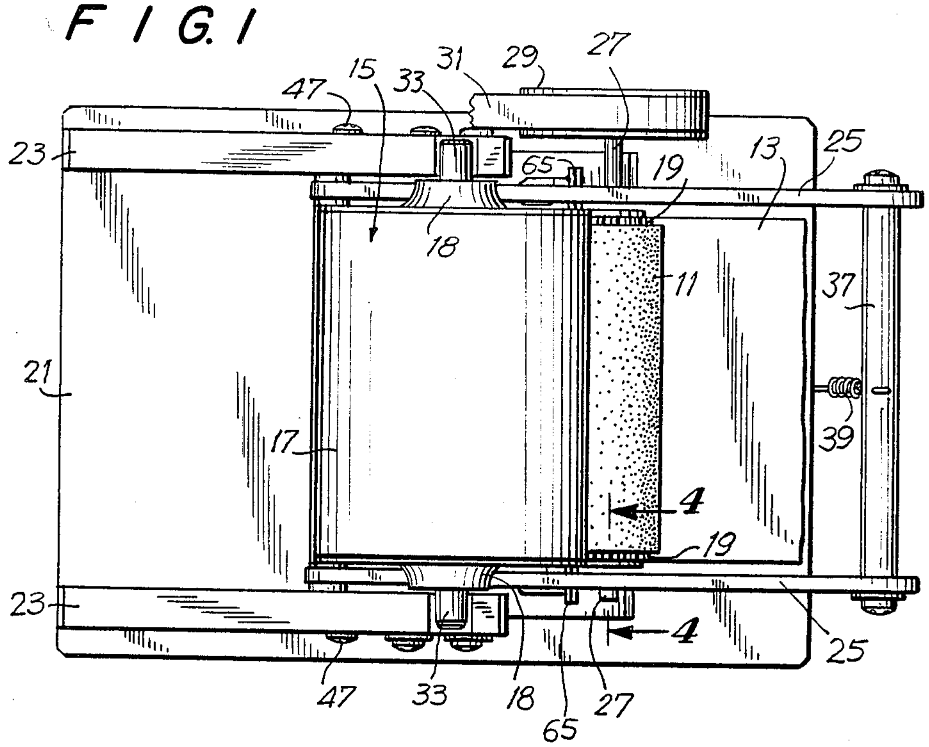
FIG. 1 is a top plan view of a portion of a thermal printing mechanism constructed in accordance with the invention.
Figure 2:
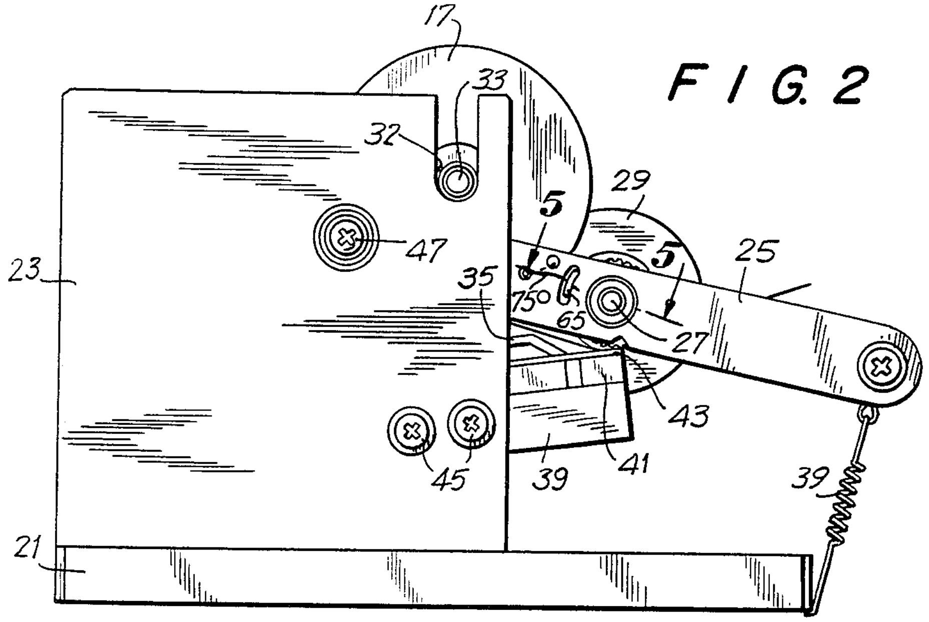
FIG. 2 is a side elevational view of the apparatus shown in FIG. 1.

Reference is first made to FIGS. 1 and 2, which illustrate the printing mechanism of a thermal printer in accordance with the invention. The printing mechanism is housed in a base member 21 and side walls 23 and includes a paper supply 15, a resilient roller 11 and a print head 41, all of which are of conventional construction which is well-known in the art. Paper supply 15 includes a roll of paper 17 and hub members 18 extending outwardly therefrom, which are keyed to a rotating support axle 33 extending longitudinally through paper roll 17. The ends of axle 33 are journaled within notches 32 of side walls 23 to enable paper roll 17 to rotate in response to a pulling force exerted on the leading paper portion 13 of paper roll 17.

Resilient roller 11 is rotatably disposed about shaft 27, which extends axially to support rotatable serrated disc members 19 positioned adjacent roller 11 at either end thereof. Shaft 27 is journaled for rotation at both ends in pivot arms 25. Pivot arms 25 are pivotally connected at their rearward ends to the inside portions of side walls 23 by means of screw members 47, permitting arms 25 to move upwardly or downwardly in response to an upward or downward force. However, pivot arms 25 are connected at their forward ends to a rod member 37, which is attached to a spring 39. Spring 39 is secured to base 21 and exerts a downward force on arms 25, thereby biasing roller 11 towards print head 41.

Print head 41 includes print head surface 43 and a print head supporting base 39. Surface 43 is provided with a paper guide 35 for guiding paper portion 13 under roller 11 and along surface 43. Base 39 is rigidly secured to side walls 23 by means of screw members 45. Spring 39 biases resilient roller 11 against surface 43 of print head 41.

In order to rotate roller 11 during printing, a pulley 29 is keyed to one end of shaft 27. A drive belt 31 (partially shown in FIG. 1) is trained around pulley 29, and is connected to a conventional motor means (not shown) in order to drive pulley 29. By virtue of the force of spring 39, the rotation of resilient roller 11 pulls paper portion 13 under roller 11 and along print head surface 43.

Surface 43 is provided with a plurality of conventional, image-forming resistors which are arrayed along the portion of surface 43 that maintains contact with paper portion 13. When an electrical current passes through the resistors, the heat generated therein produces a dot image on paper portion 13. Through the appropriate selection of electrical current and paper motion by the motor, print characters are formed on paper portion 13.

Figure 4:
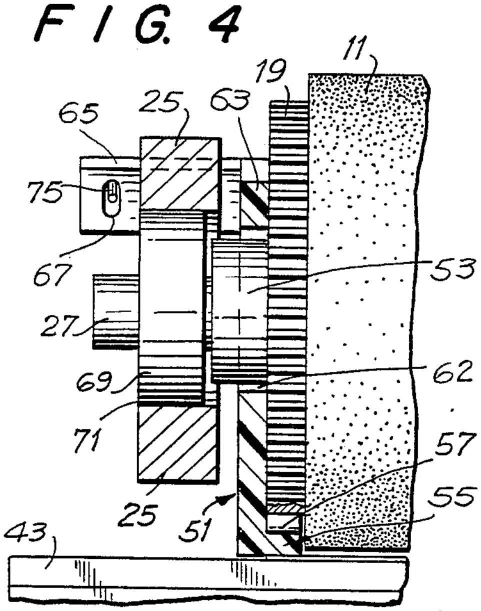
FIG. 4 is a cross-sectional view taken substantially along the line 4—4 of FIG. 1.
Figure 5:
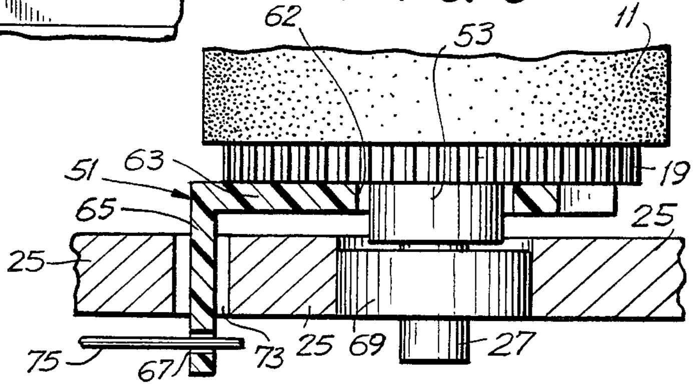
FIG. 5 is a cross-sectional view taken substantially along the line 5—5 of FIG. 2.

FIGS. 4 and 5 illustrate more clearly how pivot arms 25 support resilient roller 11. As previously described, serrated disc members 19 are disposed on shaft 27 at either end of resilient roller 11. As shown in FIGS. 4 and 5, roller 11 also includes hub members 53, each of which projects outwardly beyond the associated disc member 19. Shaft 27 is rotatably connected to pivot arms 25 by load bearing fasteners 69 which fit snugly within openings 71 in pivot arms 25. This construction enables roller 11 to rotate freely with respect to arms 25 when the motor means, as previously described, is activated.

Figure 3:
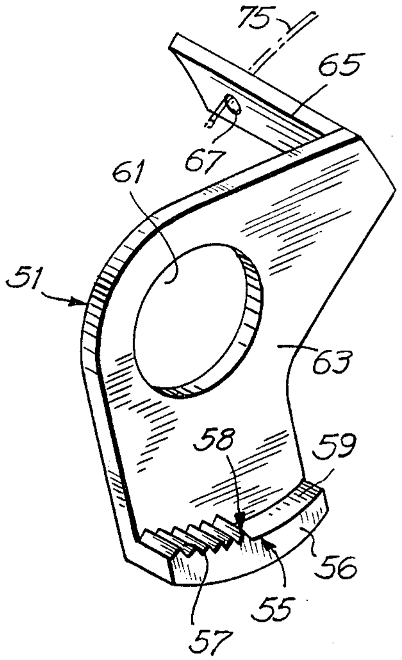
FIG. 3 is a perspective view of an unloading lever used to carry out a preferred embodiment of the invention.

Referring now also to FIG. 3, a pressure unloading lever 51 in accordance with the invention is shown. As shown best in FIGS. 4 and 5, lever 51 is disposed between serrated disc member 19 and pivot arm 25, and comprises a body portion 63 having a tapered shoulder 55 extending from one end thereof and a spring arm 65 extending from the other end thereof. Body portion 63 is formed with a substantially circular opening 61 having a diameter which is not less than and is preferably somewhat greater that the diameter of hub member 53. When lever 51 is operatively positioned between disc member 19 and pivot arm 25, a substantially annular space 62 is formed between hub member 53 and the inner wall 60 of opening 61 of lever 51.

Tapered shoulder 55 of lever 51 includes a side surface 56 and a top surface 58. Top surface 58 is divided into a leading smooth surface 59 and a trailing serrated surface 57. The width of side surface 56 gradually increases from the region of leading smooth surface 59 to the region of trailing serrated surface 57. When lever 51 is operatively positioned between pivot arm 25 and disc member 19, the bottom surface of shoulder 55 rests upon print head surface 43, and serrated surface 57 is aligned underneath serrated disc member 19, as is best shown in FIG. 4.

Spring arm 65 of lever 51 is substantially rectangular in shape and projects perpendicularly to the plane of body portion 63, in the opposite direction from shoulder 55. Spring arm 65 is formed with a pin hole 67 for receiving therein one end of a light spring member 75 (shown best in FIGS. 6 and 7). When lever 51 is operatively positioned between pivot arm 25 and disc member 19, arm piece 65 is inserted through a slot 73 formed in pivot arm 25, rearwardly of opening 71. Slot 73 is larger than spring arm 65, so that arm 65 can slide from a first upper position to a second lower position, depending on the rotational movement of lever 51, but spring member 75 biases spring arm 65 of lever 51 towards the upper position shown in FIG. 7.

Figure 6:
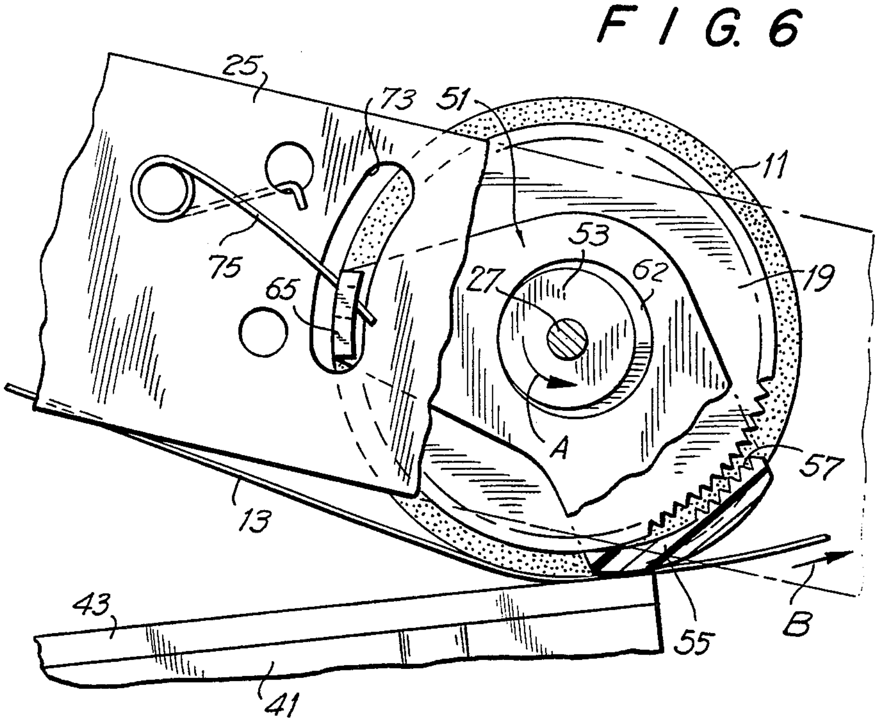
FIG. 6 is an enlarged side view, partially in phantom, of the invention, showing the positions of the resilient roller, print head and unloading lever while the printing operation is taking place.
Figure 7:
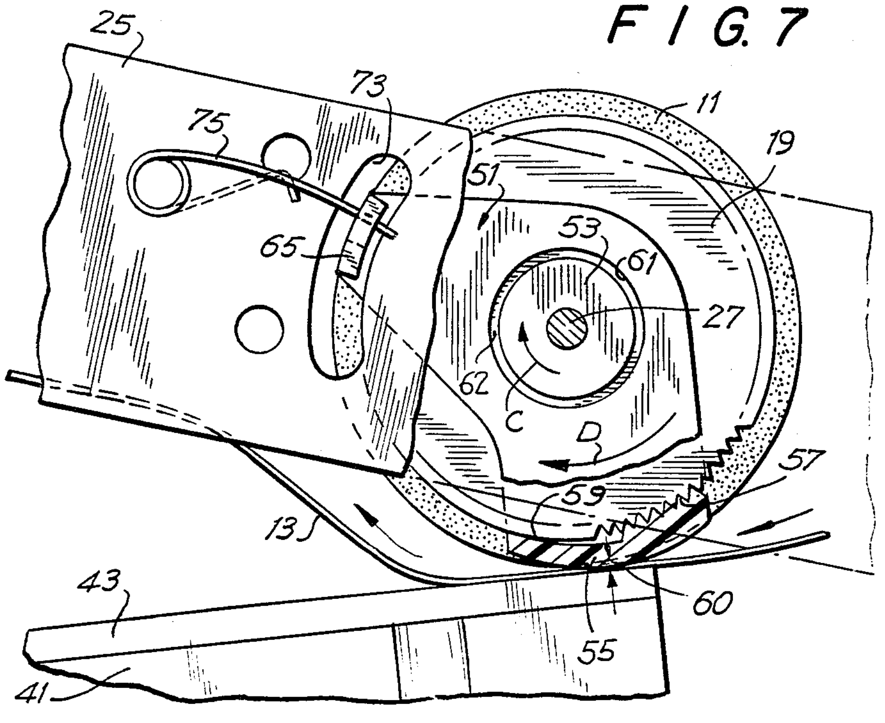
FIG. 7 is a view similar to FIG. 6 showing the positions of the resilient roller, print head and unloading lever when the printing operation is halted.

Turning now to FIGS. 6 and 7, the operation of the mechanism in accordance with the invention is illustrated. During printing, as best shown in FIG. 6, roller 11 rotates in the direction shown by arrow A, which drives lever 51 in the direction of movement of paper portion 13, as shown by arrow B. Lever 51 will rotate until the serrations of serrated surface 57 separate from the serrations of serrated disc member 19. Separation is only if lever 51 fits loosely over hub member 53 so that lever 51 can freely pivot thereabout. Moreover, rotation of lever 51 drives spring arm 65 to the bottom region of slot 73, against the bias of light spring member 75.

Since the rotation of roller 11 drives lever 51 in the direction of movement of paper portion 13, roller 11 will press against print head surface 43 in response to the downward force exerted on arms 25 by spring 39. Contact between roller 11 and surface 43 is because the thickness of the leading end of shoulder 55, when added to the radius of serrated disc member 19, is less than the radius of roller 11. The pressure exerted by roller 11 on print head 41 is maintained throughout the printing operation.

When printing is completed, or is even temporarily suspended, the microprocessor controlling the printing mechanism signals the motor means to reverse momentarily the direction of rotation of roller 11, as shown by arrow C in FIG. 7. The microprocessor may be pre-programmed, in a manner which is well-known in the art, to cause such a momentary reversal of the motor means. This slight reverse rotation of roller 11, in conjunction with the force exerted by light spring member 75, causes spring arm 65 to move upward slightly, in turn forcing the serrations of disc member 19 to engage the serrations of serrated surface 57 of shoulder 55. This meshing engagement will cause further reverse rotation of lever 51 to take place (in the direction of arrow D), thereby driving spring arm 65 further upward in channel 73, as illustrated in FIG. 7.

In accordance with the invention, the thickness of the trailing portion of shoulder 55, when added to the radius of disc member 19, is chosen so as to be greater than the radius of roller 11. Moreover, since shoulder 55 is tapered, reverse rotation of lever 51 enables shoulder 55 to cam roller 11 and print head surface 43 apart so that pressure is no longer exerted by print head 41 on roller 11. This camming action is since the position of roller 11 is not fixed rigidly in space, but is supported pivotally by pivot arms 25, as previously described. As a result of this camming action, a gap 60 is formed between roller 11 and paper portion 13 in order to prevent formation of a flat on roller 11.

Figure 8:
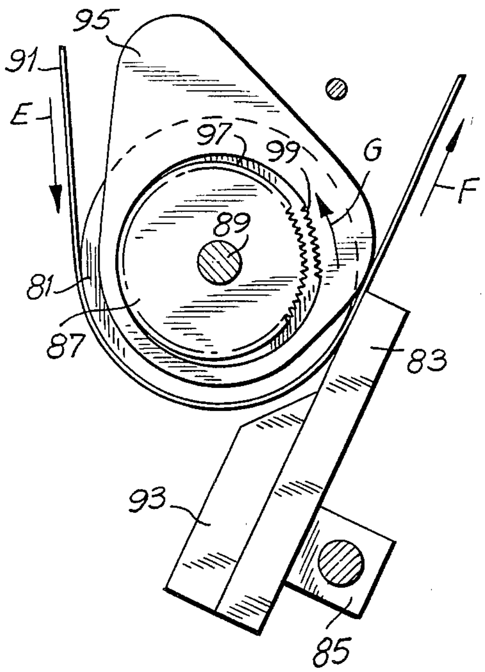
FIG. 8 is a side plan view of an alternate embodiment of the invention, showing the positions of the roller, print head and lever during printing.
Figure 9:
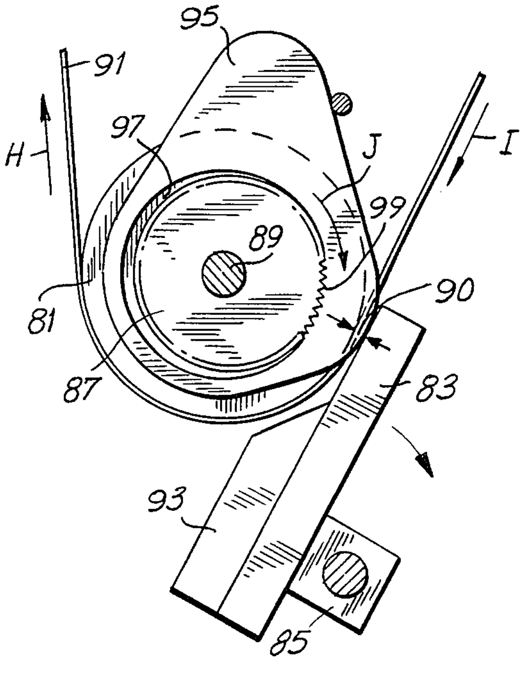
FIG. 9 is another view of the embodiment of FIG. 8, showing the positions of the roller, print head and lever during non-printing.

Turning now to FIGS. 8 and 9, a second embodiment of the roller pressure unloading means in accordance with the invention is shown. Although not shown for purposes of clarity, the second embodiment includes many of the features found in the first embodiment and illustrated in FIGS. 1–7. The second embodiment includes a roller 81 and a print head 83, positioned in a thermal printing mechanism in a manner similar to the first embodiment. Print head 83 is pivotally connected to a pivot member 85 which enables print head 83 to pivot in response to a force exerted thereon. Roller 81 is fixed rigidly in assembly and is rotatably disposed about shaft 89, which extends axially to support serrated disc members 87 positioned adjacent roller 81 at either end thereof. A sheet of paper 91 is provided for the printing operation and is guided between print head 83 and roller 81 by guide member 93 so that dot images are printed thermally on the paper.

In order to eliminate pressure between head 83 and roller 81 when printing does not take place, the embodiment shown in FIGS. 8 and 9 includes camming members 95 (only one of which is shown in FIGS. 8 and 9) rotatably disposed about shaft 89 adjacent but outboard of disc member 87. Camming member 95 is substantially pear shaped and is provided with a substantially circular opening 97, the diameter of which is slightly larger than the diameter of disc member 87. This enables cam member 95 to swivel about disc member 87 when a rotating force is applied. The circumferential wall formed by opening 97 includes a plurality of serrations 99 which are matingly engageable with the serrations formed along the the periphery of serrated disc 87.

During printing, as shown in FIG. 8, paper 91 is moved in the direction shown by arrows E and F and is guided by guide member 93 under roller 81 as roller 81 is rotated. This in turn drives cam member 95 in the direction of arrow G, causing serrations 99 to separate from the serrations of disc member 87. Separation is since disc member 87 can swivel within opening 97 of cam member 95.

When the printing operation is complete or is even halted briefly, the microprocessor controlling the printing mechanism signals the motor means to reverse momentarily the direction of roller rotation, thereby driving the paper 91 backwards slightly along its path of travel (as shown by arrows H and I in FIG. 9). This causes the serrations 99 of cam member 95 to engage the serrations of disc member 87. Once engagement occurs, reverse rotation of cam member 95 takes place, in the direction shown by arrow J in FIG. 9. The reverse rotation of cam member 95 enables the cam of cam member 95 to cam roller 81 and print head 93 apart so that pressure is no longer exerted on roller 81. This camming action is possible since print head 81 is not fixed in assembly, but pivots downwardly in response to pressure exerted thereon, by the cam of cam member 95. As a result of this camming action, a gap 90 is formed between roller 81 and paper 91 in order to prevent formation of a flat on roller 81.

In both embodiments described herein, it is generally understood that reverse rotation of the roller, which enables camming the roller and the print head apart, will cause the paper to move in a reverse direction a distance approximating the rotational movement of the cam member. This reverse movement of paper may be corrected when the printing operation is resumed by programming the microprocessor to advance the paper a distance equal to the distance the paper was reversed during roller pressure unloading.

In accordance with the invention, when printing is completed, the direction of roller rotation is reversed. As a result, the resilient roller will be supported by the cam members so that the print head does not exert pressure on the roller. When it is then necessary to load a roll of paper, the roller and print head may be separated manually and the leading paper portion may be positioned along the print head surface and under the resilient roller. After loading is completed, the print head and roller are once again urged together. However, because the invention includes cam members for supporting the roller, the print head will not contact the roller, even after loading of a replacement paper roll.

Although only two different embodiments are described herein, other embodiments that relieve the pressure exerted on a thermal print roller by camming the surfaces of the roller and the print head apart is within the scope of the inventive concept.

It will thus be seen that the objects set forth above, among those made apparent in the preceding description, are efficiently attained and, since certain changes may be made in carrying out the above method, and in the construction set forth, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter language, might be said to fall therebetween.

I claim:

1. A thermal printing apparatus comprising thermally sensitive paper, a thermal print head, a resilient roller which presses said paper against said print head during printing, and means for camming the print head and roller apart during non-printing in response to reverse rotation of said roller to alleviate pressure exerted by the print head on the roller.

2. The apparatus of claim 1, wherein said cam means includes a tapered protrusion having a first narrow region and a second wide region, said narrow region being in contact with the print head when said cam means is in a first printing position, said wide region being in contact with said print head when said cam means is in a second non-printing position.

3. The apparatus of claim 2, wherein said cam means reciprocates between said first position and said second position in response to reverse rotation of said roller.

4. The apparatus of claim 2, wherein said roller comprises means for engagement with said wide region of said tapered protrusion.

5. The apparatus of claim 4, wherein said engagement means comprises at least one disc member connected to said roller, and wherein said cam means comprises at least one cam member, said wide region of said at least one cam member engageable with said at least one disc member.

6. The apparatus of claim 5, wherein said at least one disc member comprises disc members positioned at either end of the roller, and wherein said at least one cam member comprises cam members disposed at either end of said roller adjacent said disc members.

7. The apparatus of claim 6, wherein said disc members include a plurality of serrated teeth along at least a portion of the circumference thereof, and wherein said wide regions of said cam members include a plurality of serrated teeth for engagement with the teeth of said disc members.

8. The apparatus of claim 7, further including means for urging engagement between the teeth of said disc members and the teeth of said cam members.

9. The apparatus of claim 8, wherein said means for urging engagement comprises spring means connected to said cam members.

10. The apparatus of claim 9, wherein said cam members include an arm member for receiving said spring means.

11. The apparatus of claim 7, wherein said disc members include outwardly protruding hub members, said cam members being pivotable about said hub members.

12. The apparatus of claim 6, wherein said tapered protrusions of said cam members comprise tapered shoulders disposed between said print head and said disc members.

13. The apparatus of claim 1, wherein at least one of said print head and said roller is movable in response to the action of said cam means.

14. In a thermal printing apparatus which includes thermally sensitive paper, a thermal print head and a resilient roller which presses said paper against said print head during printing, a method for disengaging said print head from said roller when printing is not taking place, said method comprising camming the print head and roller apart in response to reverse rotation of said roller.

15. The method of claim 14, wherein said camming step comprises reciprocating at least one cam member having a tapered shoulder with a first narrow region and a second wide region between a first printing position, wherein said narrow region is in contact with said print head, and a second non-printing position, wherein said wide region is in contact with said print head.

16. The method of claim 15, wherein rotation of said roller causes said at least one cam member to reciprocate between from said first position and said second position.

17. In a thermal printing apparatus which includes thermally sensitive paper, a thermal print head and a resilient roller which presses said paper against said print head during printing, the improvement comprising, means for camming the print head and roller apart during non-printing to alleviate pressure exerted by the print head on the roller, said cam means comprising at least one cam member, said member including a tapered protrusion having a first narrow region and a second wide region, said narrow region being in contact with the print head when said cam means is in a first printing position, said wide region being in contact with said print head when said cam means is in a second non-printing position.

18. The cam means of claim 17, wherein said wide region includes means for engagement with an engaging means of said roller.

19. The cam means of claim 18, wherein said wide region engaging means comprises a plurality of teeth.

20. The cam means of claim 18, wherein said at least one cam member further includes an arm member, said arm member connected to means for urging engagement of said wide region engaging means with said roller engaging means.

21. The cam means of claim 18, wherein said at least one cam member further includes a cut-out for receiving at least one hub member of said roller, said cut-out being larger than said hub member for enabling pivoting of said at least one cam member about said at least one hub member.

* * * * *